United States Patent [19]

Tsuji et al.

[11] 4,308,069
[45] Dec. 29, 1981

[54] PREVENTION OF SLUMP LOSS IN FRESH CONCRETE

[75] Inventors: Akitoshi Tsuji; Yoshihiro Fukushima, both of Wakayama, Japan

[73] Assignee: Kao Soap Company, Limited, Tokyo, Japan

[21] Appl. No.: 181,612

[22] Filed: Aug. 26, 1980

[30] Foreign Application Priority Data

Aug. 31, 1979 [JP] Japan .................. 54-111173

[51] Int. Cl.³ ............................. C04B 7/35
[52] U.S. Cl. ........................ 106/90; 106/314
[58] Field of Search ............. 106/90, 314, 315

[56] References Cited

U.S. PATENT DOCUMENTS

| | | | |
|---|---|---|---|
| 3,788,868 | 1/1974 | Kitsuda et al. | 106/90 |
| 4,164,426 | 8/1979 | Sinka et al. | 106/90 |
| 4,686,133 | 8/1972 | Hattori et al. | 106/90 |

FOREIGN PATENT DOCUMENTS

| | | | |
|---|---|---|---|
| 51-15856 | 3/1976 | Japan | 106/90 |
| 53-5691 | 2/1978 | Japan | 106/90 |
| 1515786 | 6/1978 | United Kingdom | 106/314 |

*Primary Examiner*—James Poer
*Attorney, Agent, or Firm*—Birch, Stewart, Kolasch & Birch

[57] ABSTRACT

Slump loss in fresh concrete is prevented by adding a powdery or granular barium, magnesium, iron or aluminum salt of a β-naphthalenesulfonic acid-formaldehyde condensate to the cement or concrete composition. About 0.01 to 10 parts by weight of the condensate per 100 parts by weight of cement, preferably Portland cement, are employed.

16 Claims, No Drawings

PREVENTION OF SLUMP LOSS IN FRESH CONCRETE

The present invention relates to concrete or cement compositions. More particularly, the present invention relates to preventing slump loss in fresh concrete by employing a powdery or granular Ba, Mg, Fe or Al salt of β-naphthalenesulfonic acid-formaldehyde condensate (hereinafter referred to as β-NSF) as an additive therein.

The greater part of concrete used in Japan, as well as in many places throughout the world, comprises ready-mixed concrete. Non-hardened fresh concrete is usually prepared in a plant by mixing and is then carried to the job or work site by means of an agitating truck. After preparation, the viscosity and hardness of the fresh concrete increase with time because of the hydration reaction of cement with water, thereby reducing the fluidity thereof and thus degrading the workability of the concrete. This phenomenon is generally called the "slump loss" of concrete. Concrete having a seriously reduced workability is unusable, since the deposition thereof is very difficult.

According to the specification of Japanese Industrial Standard A 1101, the longest carrying time of fresh concrete is limited to 90 minutes in consideration of the slump loss thereof. The phenomenon of slump loss is particularly notable with rick-mix concretes and hot-weather concretes.

In order to eliminate the slump loss, processes have been proposed in the prior art wherein a cement dispersing agent is added in small portions, or is added thereafter (Japanese Patent Publications Nos. 15856/1976 and 5691/1978). However, the slump loss cannot be prevented completely even by such processes. According to these procedures, the slump is temporarily increased by the addition of a dispersing agent but, thereafter, the slump diminishes with time. Therefore, in order to completely prevent such slump loss, it is required that the dispersing agent be added continuously. Thus, in fact, it is quite difficult to control the slump within a certain range.

After intensive investigations, the present inventors have found an additive which is capable of overcoming the defects of the prior art. This finding constitutes the basis of the present invention.

Accordingly, one of the objects of this invention is to provide a concrete admixture containing an additive which is capable of preventing slump loss in fresh concrete.

Another object of the invention is to prevent slump loss effectively and efficiently in concrete, cement or like admixtures, for example, with aggregate.

These and other objects and advantages of the invention will become apparent to those skilled in the art from a consideration of the following specification and claims.

In accordance with the present invention, it has been found that powdery or granular barium, magnesium, iron or aluminum salts of β-naphthalenesulfonic acid-formaldehyde condensate can be employed as an additive to prevent the slump loss in fresh concrete. The slump can be kept constant for a long period of time by mixing the powdery Ba, Mg, Fe or Al salt of β-NSF of the present invention together with a concrete composition or by adding said additive to the composition while the latter is mixed, or even after mixing. Furthermore, the slump property can also be kept constant for a long period of time when a concrete comprising a cement previously blended with the additive of the present invention is used.

The barium, magnesium, iron or aluminum salt of β-NSF does not exert any harmful influence upon the physical properties of the concrete. In general, the additive of the invention is used in an amount of about 0.01 to 10 weight percent, preferably about 0.1 to 1.0 weight percent, based on the weight of the cement.

The term "powdery or granular salt" as used herein indicates the salt in the form of a powder, granules or coagulum. Preferred additives are those having particle diameters of about 10–10,000∞.

The β-NSF additive of the present invention may be prepared by condensing β-sulfonated naphthalene with formaldehyde and converting the condensate into the salt. If necessary, it may further be copolycondensed with other compounds. As compounds to be copolycondensed therewith, there may be mentioned, for example, alkylnaphthalenes, phenol, anthracene, xylene, benzene, lignin, creosote oil and sulfonated products thereof, as well as amino compounds such as memamine and urea and derivatives thereof.

The slump loss preventing additive of the present invention may be employed with any class of hydraulic cements including Portland cement, slag cement, alumina cement and the like. Portland cement is preferred among the hydraulic cements.

In preparing the concrete composition, the dry ingredients, comprising cement, the inert filler material such as fine aggregate (commonly sand) and coarse aggregate (commonly stone) and the β-SNF additive may be mixed with water in any conventional manner. The additive of the invention may be added in powdery or granular form as is, or it may be added as an aqueous solution.

The following Examples are given merely as illustrative of the present invention and are not to be considered as limiting. Unless otherwise noted, the percentages therein and throughout the application are by weight.

EXAMPLE 1

(1) Components of concrete:

A mixture was prepared from the following components:

Cement: Portland cement (Onoda)

Fine aggregate (sand):
  Maximum size of 5 m/m
  (Source: Kinokawa River, Wakayama, Japan)

Coarse aggregate (crushed stone):
  Maximum size of 20 m/m
  (Source: Takarazuka, Hyogo, Japan)

Cement dispersing agent (as shown in Table 1):
  A. Na Salt of β-NSF (hereinafter referred to as MY-150).
  B. Commercially available lignin sulfonate
  C. Commercially available melamine sulfonate/formalin condensate
  D. Powdery Fe salt of β-NSF
  E. Powdery Al salt of β-NSF
  F. Powdery Mg 1alt of β-NSF
  G. Powdery Ba salt of β-NSF
  H. Powdery Li salt of β-NSF
  I. Powdery NH₄ salt of β-NSF
  J. Powdery K salt of β-NSF
  K. Powdery Ca salt of β-NSF L. Powdery Na salt of β-NSF
M. Powdery Zn salt of β-NSF Dispersing agents D through M were pulverized and fractions of sizes in the range of 1190-2380 microns determined by means of standard sieves of JIS Z 8801 were used. Experiments Nos. 5-11 in Table 1, The powdery dispersing agents were dissolved in water and then the solutions were added to a mixture of cement, fine aggregate and coarse aggregate. In Experiments Nos. 12-20, the powdery dispersing agents were directly added to a mixture of cement, fine aggregate and coarse aggregate.

(2) Method of mixing concrete and test method:
The components were weighed so as to make the total amount of the mixed product 40 liters. They were then mixed together in a tilting mixer for 3 minutes. Rotation of the mixer was 24 r.p.m. (normal operation). The components were charged in the order of the coarse aggregate, fine aggregate, cement, powdery dispersing agent and water (Experiments Nos. 12-20). In another embodiment, the components were charged in the order of the coarse aggregate, fine aggregate, cement and an aqueous solution of dispersing agent (Experiments Nos. 2-11). Each mixture was agitated for 3 minutes. Agitating for 3 minutes, the concrete was once discharged from the mixer and the slump and amount of air were determined to obtain the values at the time of the completion of agitation. Then, the concrete composition was returned to the mixer and allowed to stand for the given period of time. Thereafter, normal operation was effected for 0.5 minute prior to the discharge of the composition from the mixer. The measurement was initiated when the contact of the cement with water was initiated.

Slumps were determined after 90 and 120 minutes. Then the test pieces were collected and cured in water, and the compression strengths thereof were determined. The temperature of the concrete was 20°±2° C.

The test results are shown in Table 1. It can be seen from this Table that the slump loss is hardly observed in the fresh concretes and that no harmful influence was exerted upon the strength of the resulting concrete according to the present invention, while the slump loss after 90 minutes was remarkable in the cases wherein the dispersing agents were not used, wherein commercial dispersing agents were not used, wherein commercial dispersing agents were used, wherein a solution of Fe, Al, Mg, Ba, Li, $NH_4$ or K salt of β-NSF was used and wherein powdery Ca, Na or Zn salt of β-NSF was used.

TABLE 1

| Experiment No. | Dispersing Agent Variety | Dosage (%) | W/C (%) | S/A (%) | Mix Proportions (1) $C_3$ (kg/m$^3$) | $W_3$ (kg/m$^3$) | Slump (cm) Directly after mixing | After 30 mins. | After 60 mins. | After 90 mins. | Air Content (%) | Compressive strength (kg/cm$^2$) $\sigma 7$ | $\sigma 28$ |
|---|---|---|---|---|---|---|---|---|---|---|---|---|---|
| Comparative Liquid | | | | | | | | | | | | | |
| 1 | — | — | 67.7 | 45 | 300 | 203 | 18.7 | 14.5 | 12.4 | 10.0 | 1.5 | 185 | 290 |
| 2 | A | 0.60 | 63.0 | 43 | 300 | 189 | 18.1 | 12.2 | 8.1 | 5.0 | 1.7 | 221 | 325 |
| 3 | B | 0.25 | " | " | " | " | 18.8 | 13.5 | 9.3 | 5.8 | 2.3 | 218 | 320 |
| 4 | C | 0.50 | " | " | " | " | 17.0 | 11.5 | 7.3 | 4.4 | 1.6 | 228 | 328 |
| 5 | D | 0.25 | " | " | " | " | 16.8 | 11.9 | 8.0 | 6.1 | 1.2 | 225 | 328 |
| 6 | E | " | " | " | " | " | 16.1 | 10.7 | 7.1 | 4.9 | 1.3 | 231 | 329 |
| 7 | F | " | " | " | " | " | 18.2 | 12.4 | 8.0 | 5.6 | 1.5 | 220 | 324 |
| 8 | G | " | " | " | " | " | 17.6 | 12.0 | 8.6 | 4.3 | 1.5 | 208 | 328 |
| 9 | H | " | " | " | " | " | 16.9 | 10.9 | 6.8 | 4.7 | 1.4 | 215 | 320 |
| 10 | I | " | " | " | " | " | 18.1 | 11.6 | 7.5 | 4.0 | 1.2 | 213 | 314 |
| 11 | J | " | " | " | " | " | 17.4 | 12.1 | 8.0 | 5.1 | 1.5 | 224 | 322 |
| Powder | | | | | | | | | | | | | |
| 12 | K | " | 59.7 | " | " | 179 | 18.3 | 13.2 | 8.6 | 5.4 | 1.2 | 262 | 361 |
| 13 | L | " | " | " | " | " | 18.1 | 12.0 | 7.7 | 5.1 | 1.5 | 257 | 353 |
| 14 | M | " | " | " | " | " | 17.5 | 12.1 | 7.8 | 5.3 | 1.3 | 254 | 350 |
| Present Invention Powder | | | | | | | | | | | | | |
| 15 | D | " | 64.7 | " | " | " | 17.5 | 17.8 | 17.1 | | 1.4 | 209 | 311 |
| 16 | D | 0.50 | 63.0 | " | " | 189 | 18.4 | 19.0 | 18.3 | 18.1 | 1.3 | 220 | 328 |
| 17 | E | 0.25 | 64.7 | " | " | 194 | 17.3 | 17.6 | 17.2 | | 1.6 | 205 | 313 |
| 18 | E | 0.50 | 63.0 | " | " | 189 | 18.9 | 19.3 | 18.5 | 18.0 | 1.2 | 223 | 324 |
| 19 | F | 0.50 | " | " | " | " | 19.8 | 19.5 | 16.8 | 12.1 | 1.5 | 224 | 319 |
| 20 | G | 0.50 | " | " | " | " | 19.5 | 19.2 | 16.3 | 11.5 | 1.1 | 222 | 320 |

(1) W:Water
C:Cement
S:Fine aggregate
G:Coarse aggregate
A:S + G

EXAMPLE 2

In the embodiment shown in Example 1, the dispersing agents were added and mixed together simultaneously. On the other hand, in this Example, the manner of the addition was changed and the slump losses were determined.

(1) Components of concrete:
Cement: Onoda normal Portland cement and a cement obtained by mixing Onoda normal Portland cement together with 0.56% of powdery β-NSF-Fe salt (powders of particle diameters in the range of 4760-1190 microns according to a standard sieve) and storing the same in a closed vessel at 20° C. for 14 days.
Fine aggregate:
Maximum size of 5 m/m
(Source: Kinokawa River, Wakayama, Japan)
Coarse aggregate (crushed stone):
Maximum size of 20 m/m
(Source: Takarazuka, Hyogo, Japan)

Cement dispersing agent: Powdery Na or Fe salts of β-NSF having particles sizes of 4760-1190 microns.

(2) Method of mixing concrete and test method:

The components were weighed so as to make the total amount of the mixed product 40 liters. They were then mixed together in a tilting mixer for 3 minutes. Rotation of the mixer was 24 r.p.m. (normal operation). After completion of mixing, the slump and amount of air were measured to obtain a value of the slump immediately after the mixing. Then, the concrete composition was returned into a mixer and rotated therein at a rate of 4 r.p.m. A first process for the addition of the dispersing agent comprises adding powdery Na salt of β-NSF to MY-150/concrete mixture 30 minutes after the contact of the cement with water (Experiment No. 2) or adding powdery Fe salt of β-NSF thereto (Experiment No. 4). In a second process, powdery Fe salt of β-NSF is added after the determination of slump of the dispersing agent-free concrete directly after the mixing (Experiment No. 3). In a third process, cement incorporated with 0.56%, based on the cement, of Fe salt of β-NSF is used (the cement being stored at 20° C. for 14 days) (Experiment No. 5). The time elapsed was measured starting at the point when the cement was contacted with water.

The results are shown in Table 2. It is apparent from Table 2 that the slump loss was remarkable in the dispersing agent-free concrete after 60 minutes and that the slump was recovered when powdery Na salt of β-NSF was added to MY-150 concrete after 30 minutes, but the slump loss was remarkable after 60 minutes.

When the concrete additive of the present invention is added to the fresh concrete immediately after mixing or 30 minutes thereafter, there is essentially no slump loss, and no harmful influence is exerted on the strength of the concrete.

TABLE 2

| Experiment No. | Dispersing agent Variety | Dispersing agent Dosage (%) | Method of addition | Mix Proportions (1) W/C (%) | Mix Proportions (1) S/A (%) | Mix Proportions (1) C (kg/m³) | Mix Proportions (1) W (kg/m³) |
|---|---|---|---|---|---|---|---|
| Comparative 1 | — | — | — | 67.0 | 44 | 300 | 201 |
| 2 | MY-150 β-NSF-Na | 1.2 0.4 | β-NSF-Na added after 30 mins. | 59.0 | 43 | " | 177 |
| Present Invention 3 | β-NSF-Fe | 0.56 | β-NSF-Fe added directly | " | " | " | " |
| 4 | MY-150 β-NSF-Fe | 1.2 0.56 | β-NSF-Fe added after 30 mins. | " | " | " | " |
| 5 | β-NSF-Fe | 0.56 | Pre-blended with cement | " | " | " | " |

| Experiment No. | Slump(cm) Directly after mixing | Slump(cm) After 15 mins. | Slump(cm) After 30 mins. | Slump(cm) After 45 mins. | Slump(cm) After 60 mins. | Slump(cm) After 90 mins. | Air Content (%) | Compressive Strength (kg/cm²) σ1 | Compressive Strength (kg/cm²) σ7 | Compressive Strength (kg/cm²) σ28 |
|---|---|---|---|---|---|---|---|---|---|---|
| Comparative 1 | 18.9 | 16.1 | 12.0 | 9.3 | 7.9 | 6.7 | 1.3 | 36 | 196 | 302 |
| 2 | 19.5 | 15.2 | 10.9 | 19.6 | 15.3 | 8.9 | 1.2 | 64 | 280 | 387 |
| Present Invention 3 | 6.7 | 20.5 | 20.8 | 18.2 | 18.1 | | 1.3 | 59 | 276 | 379 |
| 4 | 18.7 | 14.0 | 9.7 | 18.7 | 17.8 | 17.8 | 1.2 | 62 | 280 | 386 |
| 5 | 18.2 | 18.8 | 18.4 | 17.6 | 17.3 | | 1.3 | 60 | 273 | 372 |

(1)W;Water
C;Cement
S;Fine aggregate
G;Coarse aggregate
A;S + G

EXAMPLE 3

The influence of the slump loss preventing additive of the present invention on rich-mix concrete and hot-weather concrete were examined.

(1) Components of concrete:
Cement: Onoda normal Portland cement.
Fine aggregate: Fine aggregate of maximum size of 5 m/m.
Coarse aggregate: Crushed stone of maximum size of 20 m/m.
Cement dispersing agent: Powdery MY-150, dispersing agent C and Fe salt of β-NSF as used in Example 1 with particle sizes in the range of 4760-1190 microns.

(2) Method of mixing concrete and test method:

The components were weighed so as to make the total amount of the mixed product 40 liters. They were then mixed in a tilting mixer for 3 minutes. Rotation of the mixer was 24 r.p.m. (normal operation). After completion of the mixing, the slump and amount of air were measured to obtain a value of slump immediately after the mixing. Then, the concrete composition was returned into the mixer and rotated therein at a rate of 4 r.p.m. The dispersing agents were added to the concrete composition at the time of the mixing (Experiments Nos. 2, 3 and 5) or 30 or 45 minutes after the contact with water (Experiments Nos. 4 and 6). The time elapsed was measured starting at the point when the cement was contacted with water. The temperature of the concrete was 33°±2° C.

The test resuls are shown in Table 3. It is apparent from Table 3 that the slump loss was hardly observed when the dispersing agents of the present invention were incorporated in fresh concrete and that no harmful influence was exerted on the strength of concrete thus obtained, while the slump loss was remarkable in dispersing agent-free concretes and concretes containing ordinary dispersing agents.

TABLE 3

| Experiment No. | Dispersing agent Variety | Dosage (%) | Method of addition | Mix Proportions (1) W/C (%) | S/A (%) | C (kg/m$^3$) | W (kg/m$^3$) |
|---|---|---|---|---|---|---|---|
| Comparative | | | | | | | |
| 1 | — | — | — | 44.4 | 40 | 500 | 222 |
| 2 | MY-150 | 1.2 | Added at the time of mixing | 35.0 | 39 | 500 | 175 |
| 3 | C | 1.0 | Added at the time of mixing | 36.1 | 39 | 500 | 181 |
| Present Invention | | | | | | | |
| 4 | Powdery MY-150 β-NSF-Fe | 1.2 0.15 | 0.15% β-NSF-Fe added after 30 mins. | 35.0 | 39 | 500 | 175 |
| 5 | Powdery β-NSF-Fe | 0.4 | Added at the time of mixing | 35.0 | 39 | 500 | 175 |
| 6 | Powdery β-NSF-Fe | 0.4 0.1 | 0.1% after 45 mins. | 35.0 | 39 | 500 | 175 |

| Experiment No. | Slump (cm) Directly after mixing | After 15 mins. | After 30 mins. | After 45 mins. | After 60 mins. | Air Content (%) | Compressive Strength (kg/cm$^2$) σ1 | σ7 | σ28 |
|---|---|---|---|---|---|---|---|---|---|
| Comparative | | | | | | | | | |
| 1 | 18.5 | 16.2 | 14.6 | 12.1 | 10.0 | 1.4 | 117 | 359 | 552 |
| 2 | 19.0 | 16.8 | 14.2 | 10.8 | 7.7 | 1.3 | 230 | 456 | 664 |
| 3 | 18.0 | 15.7 | 13.9 | 10.4 | 7.2 | 1.5 | 231 | 462 | 658 |
| Present Invention | | | | | | | | | |
| 4 | 18.3 | 16.1 | 13.8 | 19.2 | 18.8 | 1.2 | 236 | 454 | 660 |
| 5 | 3.0 | 19.5 | 19.9 | 18.8 | 18.6 | 1.3 | 237 | 461 | 659 |
| 6 | 1.1 | 8.3 | 9.5 | 8.5 | 17.6 | 1.4 | 233 | 451 | 663 |

The invention being thus described, it will be obvious that the same may be varied in many ways. Such variations are not to be regarded as a departure from the spirit and scope of the invention, and all such modifications are intended to be included within the scope of the following claims.

What is claimed is:

1. A cement composition having improved slump loss characteristics comprising cement and powdery or granular iron or aluminum salt of a β-naphthalenesulfonic acid-formaldehyde condensate having a particle diameter of from about 10 to 10,000 microns.

2. A composition according to claim 1, wherein the cement is a hydraulic cement.

3. A composition according to claim 2, wherein the cement is Portland cement.

4. A cement composition having improved slump loss characteristics comprising about 0.01 to 10 parts by weight of a powdery or granular iron or aluminum salt of a β-naphthalenesulfonic acid-formaldehyde condensate having a particle diameter of from about 10 to 10,000 microns to 100 parts by weight of cement.

5. A composition according to claim 4, wherein the cement is Portland cement.

6. A composition according to claim 4, comprising about 0.1 to 1.0 parts by weight of said condensate.

7. A composition according to claim 6, wherein the cement is Portland cement.

8. A concrete composition having improved slump loss characteristics comprising cement, aggregate and about 0.01 to 10 parts by weight, per 100 parts by weight of said cement, of a powdery or granular iron or aluminum salt of a β-naphthalenesulfonic acid-formaldehyde condensate having a particle diameter of from about 10 to 10,000 microns.

9. A composition according to claim 8, wherein the cement is a hydraulic cement.

10. A composition according to claim 9, wherein the cement is Portland cement.

11. A method for preventing slump loss in fresh concrete which comprises adding about 0.01 to 10 parts by weight, per 100 parts by weight of cement, of a powdery or granular iron or aluminum salt of a β-naphthalenesulfonic acid-formaldehyde condensate having a particle diameter of from about 10 to 10,000 microns to a wet or dry concrete composition.

12. The method of claim 11, wherein said condensate is previously blended with the raw cement.

13. The method of claim 11, wherein said condensate is added to the concrete while it is being mixed.

14. The method of claim 11, wherein said condensate is added to the concrete after it has been mixed.

15. The method of claim 11, wherein said condensate is added to a concrete composition comprising Portland cement and aggregate.

16. A method for preventing slump loss in fresh concrete which comprises adding a aqueous solution of an iron or aluminum salt of a β-naphthalenesulfonic acid-formaldehyde condensate having a particle diameter of from about 10 to 10,000 microns to a wet or dry concrete composition in an amount to provide a final weight ratio of about 0.01 to 10 parts by weight of said salt per 100 parts by weight of cement.

* * * * *